United States Patent [19]

Troisi

[11] Patent Number: 5,434,366
[45] Date of Patent: Jul. 18, 1995

[54] CHECKWEIGHER

[75] Inventor: David A. Troisi, Ithaca, N.Y.

[73] Assignee: Hi-Speed Checkweigher Co., Inc., Ithaca, N.Y.

[21] Appl. No.: 942,647

[22] Filed: Sep. 9, 1992

[51] Int. Cl.⁶ .................... G01G 13/00; G01G 19/00
[52] U.S. Cl. ........................................ 177/52; 177/145
[58] Field of Search ................................ 177/145, 52; 209/592–596

[56] References Cited

U.S. PATENT DOCUMENTS

| 2,307,695 | 1/1943 | Mansbendel | 209/121 |
| 2,661,091 | 12/1953 | Maloney | 177/145 |
| 3,053,332 | 9/1962 | Buchtenkirch et al. | 177/120 |
| 3,736,997 | 6/1973 | Bottorf | 177/145 |
| 3,800,893 | 4/1974 | Ramsay et al. | 177/25 |
| 4,344,493 | 8/1982 | Salmonsen et al. | 177/145 X |
| 4,538,694 | 9/1985 | Hudson | 177/145 |
| 4,566,584 | 1/1986 | Lindstrom | 198/504 |
| 4,583,636 | 4/1986 | Tas | 177/145 X |
| 4,696,357 | 9/1987 | Beehler et al. | 177/145 |

FOREIGN PATENT DOCUMENTS 2160985  6/1984  United Kingdom .

Primary Examiner—George H. Miller, Jr.
Attorney, Agent, or Firm—Bean, Kauffman & Spencer

[57] ABSTRACT

A method and apparatus is disclosed for use in weighing products having circular or oval footprint configuration. A conveyor having a pair of parallel conveyor elements arranged to underengage the footprint only adjacent the periphery thereof transports the products one at a time across a weigh pan or scale device, whose length in the direction of conveyor movement is selected as the lowest value required to achieve a desired settle time for the weigh pan. Preferably, the length of the weigh pan is chosen to be essentially equal to the diameter of products to be weighed.

14 Claims, 3 Drawing Sheets

CHECKWEIGHER

BACKGROUND OF THE INVENTION

The invention generally relates to high speed weighing equipment of the type employing a conveyor to transport containers one at a time across a vertically deflectable weigh pan or scale device operable to effect weighing of the products. More particularly, the invention relates to improvements in weighing equipment of the type intended for use in the weighing of containers having either circular or oval footprint configurations and employing conveyors characterized as having a pair of parallel conveying elements, such as endless chains, arranged to underengage the footprints of the containers as they transport the containers for movement across a weigh pan.

When products to be introduced to a checkweigher for weighing purposes are containers having circular or oval footprint configurations, it has been standard industrial practice to introduce the containers from an upstream operation, such as from a filler, in a butt-to-butt or adjacent container touching condition, and then employ a timing worm or other spacing device to accelerate the containers up to a given conveyor transport speed required by system operating conditions and to properly space containers lengthwise of the conveyor in order to ensure the presence of only one container on the weigh pan during each weighing operation.

In the design of checkweighing equipment of the type described, use may be made of the following equations to determine settle time, i.e. the time from when a container is fully on a weigh pan or scale platform until it begins to be transferred off the weigh pan:

Pitch = weigh pan length (ft.) + margin of safety
Speed = pitch × container feed rate $$\text{Settle time} = \frac{(\text{weigh pan length} - \text{container length})}{\text{speed}}$$

An accepted shortcut to calculate settle time in milliseconds is:

$t(ms) = 5000 \times (wpl - pl)/v$,
where $t$ = time in ms
5000 = conversion factor for ft./in. and min./ms
$wpl$ = weigh pan length in inches
$pl$ = container length in inches
$v$ = conveyor speed in fpm.

The type of weighing mechanism employed will determine the required minimum settle time which must be made available in order to weigh each container, with the accuracy of the results of the weighing operation tending to increase as the length of settle time increases beyond such minimum.

The length of the weigh pan was determined by trial and error upon consideration being given to container feed rate, container length and conveyor speed with weigh pan length increasing as these factors increase. The margin of safety, which is combined with weigh pan length to produce the required pitch or distance between leading edges of adjacent containers, is typically required to be on the order of one inch for the normal range of conveyor speeds in order to ensure against the presence of more than one container on the weigh pan during a weighing operation.

The length of the container is determined by its size and the requirement that the conveyor be designed to provide the most stability for the container as it is conveyed across the weigh pan, during which time it is not otherwise stabilized, as by side mounted guides whose presence would interfere with vertical movement of the container during the weighing operation. Typically, the selection of the distance between centers of the conveyor elements for best container support was determined for containers having circular footprints by a simple geometric construction, where mutually perpendicular diameters were drawn in a circle that represents the footprint of the container, and then two parallel chords were drawn connecting the ends of the diameters to represent the centers of the conveyor elements. The chords defined by the inner or facing edges of the conveyor elements underengaging the footprint, which are parallel to and inwardly of the drawn chords, were then used as the container length in solving the above settle time equation.

Checkweighers constructed with the above considerations in mind have proven adequate for many years to handle container feed rates commonly encountered in the food processing industry. In recent years, demands for checkweighers capable of handling higher container feed rates have been met by increasing weigh pan length and conveyor speed. However, as conveyor speeds have been increased, there has been experienced an increase in problems, including for example an increase in conveyor noise and wear, and reduction in stability of containers during a weighing operation, particularly for the case of taller containers.

SUMMARY OF THE INVENTION

The present invention relates to improvements in checkweighers which permit a desired settle time to be achieved while reducing both length of the weigh pan and conveyor chain speed.

The present invention achieves substantial improvements in performance over prior checkweighers by arranging the conveyor chains to underengage the product footprint only immediately adjacent the periphery thereof in order to minimize the effective length of each product seen by the weigh pan and then reducing the length of the weigh pan to reduce the instability of products transported thereover in this fashion. Modification of prior checkweighers in this fashion provides for substantial increase in available settle time, as well as a reduction in conveyor speed, when compared to such prior checkweighers.

The improved characteristics according to the present invention further allow the margin of safety to be substantially reduced, as compared to that required for prior checkweighers, and this in turn serves to provide for further reduction in conveyor speeds encountered for any given settle time.

In a presently preferred form of the invention, the length of the weigh pan is selected to correspond essentially exactly to the diameter of a product to be weighed.

Reduced conveyor speeds, achievable with the practice of the present invention, are highly desirable. Alternatively, the present invention allows a checkweigher to accommodate a greater product feed rate, as compared with prior checkweighers, for any given conveyor speed.

BRIEF DESCRIPTION OF THE DRAWINGS

The nature and mode of operation of the present invention will now be more fully described in the following detailed description taken with the accompanying drawings wherein.

DETAILED DESCRIPTION

Figure 1:
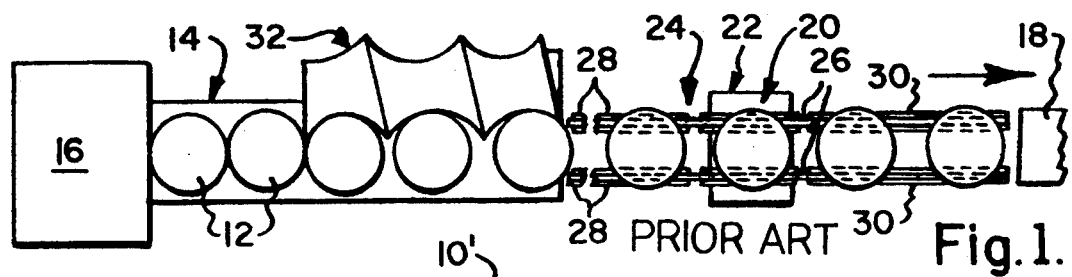
FIG. 1 is a schematic view showing a checkweigher arranged to weigh containers received from an upstream processing operation.

Reference is first made to FIG. 1, wherein there is shown a typical prior art checkweighing system including checkweigher 10 arranged to weigh cylindrical containers 12 supplied by an infeed conveyor 14 one at a time from a processing station, such as a filler 16 serving to introduce a product, such as soup, into the containers. After a weighing operation, containers determined to be of proper weight are transported by a discharge conveyor 18 to a desired downstream processing station, not shown, and a suitable discharge device, also not shown, is normally arranged adjacent the outlet end of checkweigher 10 for purposes of separating and discharging containers determined to be of improper weight before the latter are presented to the downstream processing station.

A typical checkweigher comprises a weigh pan or scale platform 20 supported for vertical displacement by a displacement measuring device, such as a compression strain gage type transducer 22, and a conveyor mechanism 24 for transporting containers 12 one at a time across the weigh pan, as an incident to which the measuring device produces an output signal(s) indicative of the weight of each presented container. Conveyor mechanism 24 may be variously defined, but typically it may include, as depicted in FIG. 1, a pair of driven parallel conveyor elements in the form of endless chains 26,26 having a generally horizontal conveyor flight slidably supported in sequence by vertically stationary, infeed guides 28,28; weigh pan 20; and vertically stationary discharge guides 30,30. Alternatively, the conveyor may be defined by separate conveyor inlet, weighing and discharge sections associated, respectively, with infeed guides 28,28; weigh pan 20 and discharge guides 30,30, wherein the conveyor chains of the sections are aligned and driven at the same speed.

Further, in accordance with standard practice, a timing worm or other suitable spacing device 32 would be positioned adjacent the inlet end of checkweigher 10 and employed to act on containers 12 supplied thereto in a butt-to-butt fashion, so as to accelerate the containers up to a given conveyor transport speed required by the system operating conditions and to properly space the containers lengthwise of chains 26,26 in order to ensure that only one container is positioned above weigh pan 20, during a weighing operation.

Figure 4:
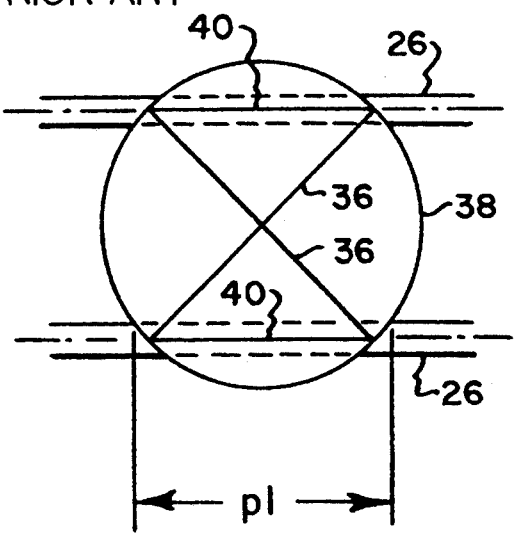
FIG. 4 is a view showing the conventional manner of determining placement of chain centers.

For purposes of illustration of typical operating parameters of prior high speed checkweighing equipment, reference is first made to the following Chart I whose values were calculated using the standard equations:

Pitch = weigh pan length (ft.) + margin of safety,
Speed = pitch × container feed rate, and
t(ms) = 5000 × (wpl − pl)/v for the case where it is required to weigh 600 standard soup size cans per minute, wherein such cans have footprint diameters of 3.00 inches. A standard safety margin of one inch was employed in calculating pitch and the effective length "pl" of each container was determined to be 2.25 inches by use of the standard construction method shown in FIG. 4, wherein mutually perpendicular diameters 36,36 were drawn in a circle 38 having a diameter of 3.00 inches, which represents the circular footprint or lower engageable or support surface of the containers to be weighed, and then two parallel chords 40,40 were drawn between the ends of the diameters to represent the centers of the conveyor chains 26,26. Use of conveyor chains of ⅜ inch width with a 3.00 inch diameter can is depicted in FIG. 4. For this arrangement, and assuming the cans are accurately centered on conveyor chains 26,26, the effective length of a can is 2.25 inch and corresponds to chords defined by the inner or facing edges of the conveyor chains underengaging the footprint, such chords or inner edges being arranged inwardly of and parallel to the drawn chords.

CHART I

| WPL (IN) | EFFECTIVE PKG LENGTH (IN) | PACKAGE PITCH (IN) | SPEED (FPM) | SETTLE TIME (ms) |
| --- | --- | --- | --- | --- |
| 4.00 | 2.25 | 5.00 | 250 | 35 |
| 5.00 | 2.25 | 6.00 | 300 | 46 |
| 6.00 | 2.25 | 7.00 | 350 | 54 |
| 7.00 | 2.25 | 8.00 | 400 | 59 |
| 8.00 | 2.25 | 9.00 | 450 | 64 |
| 9.00 | 2.25 | 10.00 | 500 | 68 |
| 10.00 | 2.25 | 11.00 | 550 | 70 |
| 11.00 | 2.25 | 12.00 | 600 | 73 |
| 12.00 | 2.25 | 13.00 | 650 | 75 |
| 13.00 | 2.25 | 14.00 | 700 | 77 |
| 14.00 | 2.25 | 15.00 | 750 | 78 |
| 15.00 | 2.25 | 16.00 | 800 | 80 |
| 16.00 | 2.25 | 17.00 | 850 | 81 |
| 17.00 | 2.25 | 18.00 | 900 | 82 |
| 18.00 | 2.25 | 19.00 | 950 | 83 |

Figure 2:
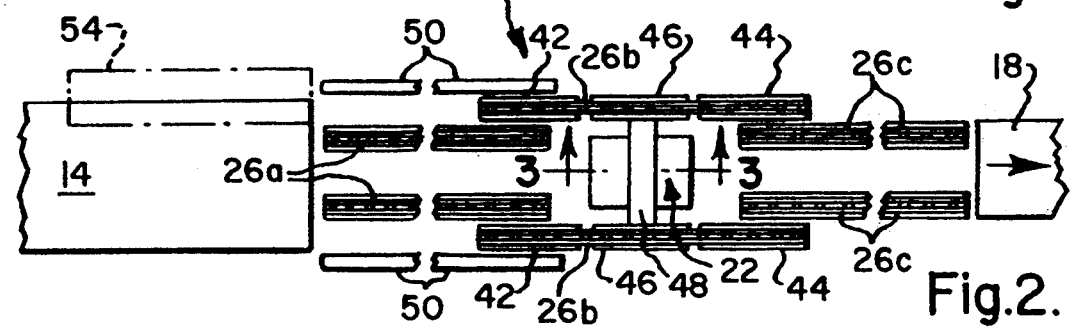
FIG. 2 is an enlarged schematic view of a checkweigher.

In accordance with the present invention, checkweigher 10' is shown in FIG. 2 as being provided with separately driven, but like speed, infeed, weighing and discharge conveyor sections having pairs of parallel conveyor chains 26a,26a; 26b,26b and 26c,26c, respectively, wherein the center-to-center spacing of chains 26b,26b is greater than the center-to-center spacing of the chains 26a,26a and 26c,26c, and the opposite ends of chains 26b,26b bridge across adjacent ends of chains 26a,26a and 26c,26c in order to provide an uninterrupted transport support surface for underengaging the footprints of the containers to be weighed.

Figure 3:
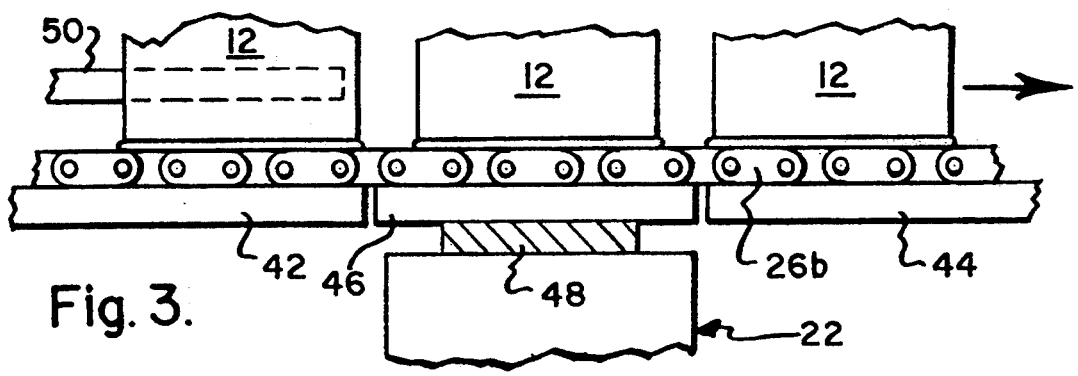
FIG. 3 is a sectional view taken generally along the line 3—3 in FIG. 2.

Referring to FIGS. 2 and 3, it will be understood that the upper flights of conveyor chains 26b,26b have their upstream and downstream ends supported by vertically stationary guides 42,42 and 44,44, respectively, and their central or intermediate portions supported by vertically movable guides 46,46, which are interconnected by transversely extending bracket 48 and coupled thereby to transducer 22. Guides 46,46 serve to define weigh pan 20, whose length is the lengthwise dimension of such guides. Preferably, a pair of parallel side guide rails 50,50 are arranged to extend lengthwise of conveyor chains 26a,26a and have their downstream ends terminate intermediate the ends of stationary chain guides 42,42, and preferably immediately adjacent the upstream ends of guides 46,46 in order to stabilize containers 12 during transport thereof towards the weigh pan.

Figure 5:
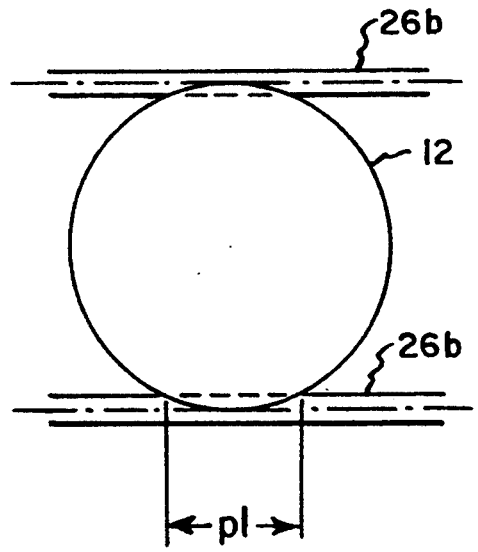
FIG. 5 is a view showing placement of chain centers in accordance with the present invention.

By now referring to FIG. 5, it will be noted that the center-to-center spacing between conveyor chains 26b,26b preferably corresponds essentially to the footprint diameter of containers 12 to be weighed, such that the container length "p1" actually supported by such chains is substantially reduced compared with the value of "p1" shown in FIG. 4 as being obtained by practice of the conventional construction method described above. On the other hand, the center-to-center spacing between conveyor chains 26a,26a and 26c,26c is preferably as close as possible to the normal spacing obtained by use of the conventional construction method. Use of conveyor chains of ⅜ inch width with a 3.00 inch diameter can is depicted in FIG. 5. While this mode of supporting containers 12 by conveyor chains 26b,26b during passage over a weigh pan is obviously undesirable from a stability point of view, it has been found to be nonetheless acceptable practice under the substantially reduced weigh pan length and conveyor speed operating conditions permitted by the practice of the present invention. Moreover, it has been found that the reductions in weigh pan lengths obtainable by the practice of the present invention allows for substantial reduction in the required margin of safety compared to prior conventional checkweigher practice, which in turn serves to permit a substantial reduction in required conveyor speed for a given set of checkweigher operating requirements.

With the practice of the present invention, a conventional timing worm need not be used to impart substantial accelerations to containers fed to checkweigher 10'. However, it is still desired that proper spacing be maintained between containers in order to prevent the presence of more than one container on the weigh pan, during a weighing operation, and to maximize rate of feed of containers through the checkweigher. Proper container spacing may be achieved by driving conveyor chains 26a,26a; 26b,26b and 26c,26c at a slightly faster transport speed than infeed conveyor 14, assuming that containers 12 are presented by the latter in butt-to-butt relationship. Alternatively, a suitable timing device 54 shown in broken line in FIG. 2 may be arranged adjacent the discharge end of infeed conveyor 14 for purposes of providing for proper container spacings.

To facilitate appreciation of the advantages obtained by the practice of the present invention, reference is made to the following Chart II, whose values were calculated by using the same standard equations employed in producing Chart I for the like case of a required feed rate of 600 standard soup size cans per minute, but with reductions in effective container length to 1.25 inch and margin of safety to 0.25 inch.

| CHART II | | | | |
|---|---|---|---|---|
| WPL (IN) | EFFECTIVE PKG LENGTH (IN) | PACKAGE PITCH (IN) | SPEED (FPM) | SETTLE TIME (ms) |
| 4.00 | 1.25 | 4.25 | 212.5 | 65 |
| 5.00 | 1.25 | 5.25 | 262.5 | 71 |
| 6.00 | 1.25 | 6.25 | 312.5 | 76 |
| 7.00 | 1.25 | 7.25 | 362.5 | 79 |

-continued

| CHART II | | | | |
|---|---|---|---|---|
| WPL (IN) | EFFECTIVE PKG LENGTH (IN) | PACKAGE PITCH (IN) | SPEED (FPM) | SETTLE TIME (ms) |
| 8.00 | 1.25 | 8.25 | 412.5 | 82 |
| 9.00 | 1.25 | 9.25 | 462.5 | 84 |
| 10.00 | 1.25 | 10.25 | 512.5 | 85 |
| 11.00 | 1.25 | 11.25 | 562.5 | 87 |
| 12.00 | 1.25 | 12.25 | 612.5 | 88 |
| 13.00 | 1.25 | 13.25 | 662.5 | 89 |
| 14.00 | 1.25 | 14.25 | 712.5 | 89 |
| 15.00 | 1.25 | 15.25 | 762.5 | 90 |
| 16.00 | 1.25 | 16.25 | 812.5 | 91 |
| 17.00 | 1.25 | 17.25 | 862.5 | 91 |
| 18.00 | 1.25 | 18.25 | 912.5 | 92 |

Figure 6:
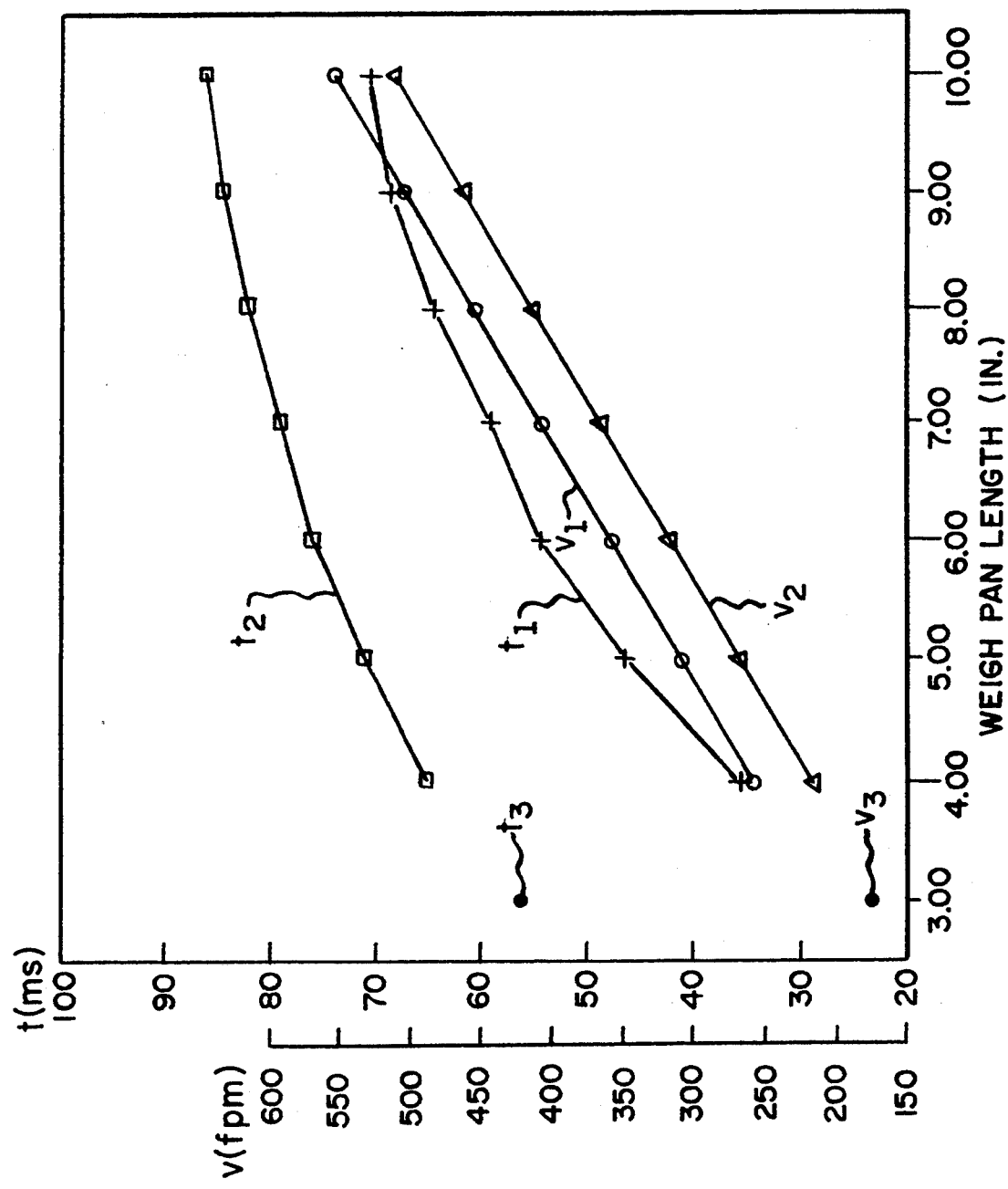
FIG. 6 is a graph providing an illustrative comparison of settle time and conveyor speed achievable with the present invention and that obtainable by use of prior art techniques.

Chart I and Chart II are plotted in FIG. 6, wherein curves $t_1$ and $v_1$ represent the values of settle time and conveyor speed shown in Chart I and curves $t_2$ and $v_2$ represent the values of settle time and conveyor speed shown in Chart II. The significance of the changes in checkweigher operating conditions resulting from a practice of the present invention will become more apparent upon viewing FIG. 6, when it is understood that the most sensitive weighing devices presently available for use with checkweighers of the type described require a minimum of between 40 ms and 45 ms settle time, and that it is always desirable to increase the settle time to the greatest possible extent in order to maximize the accuracy of the weights being measured. If, for purposes of comparison, it is assumed that a previously typical settle time of 65 ms is required to produce a sufficient level of accuracy in weighing 3.00 inch diameter soup cans at a rate of 600 cans per minute, the present invention would require a weigh pan length of 4.00 inches and a conveyor speed of 212.5 fpm, whereas prior practice would require a weigh pan length of greater than 8.00 inches and a conveyor speed greater than 450 fpm. FIG. 6 illustrates that use of the present invention permits reduction of the values of weigh pan length and conveyor speed to less than one half those required by prior commercial practice for a given required settle time. This general pattern is consistent with increases in the size and rate of feed of containers to be weighed.

Figure 7:
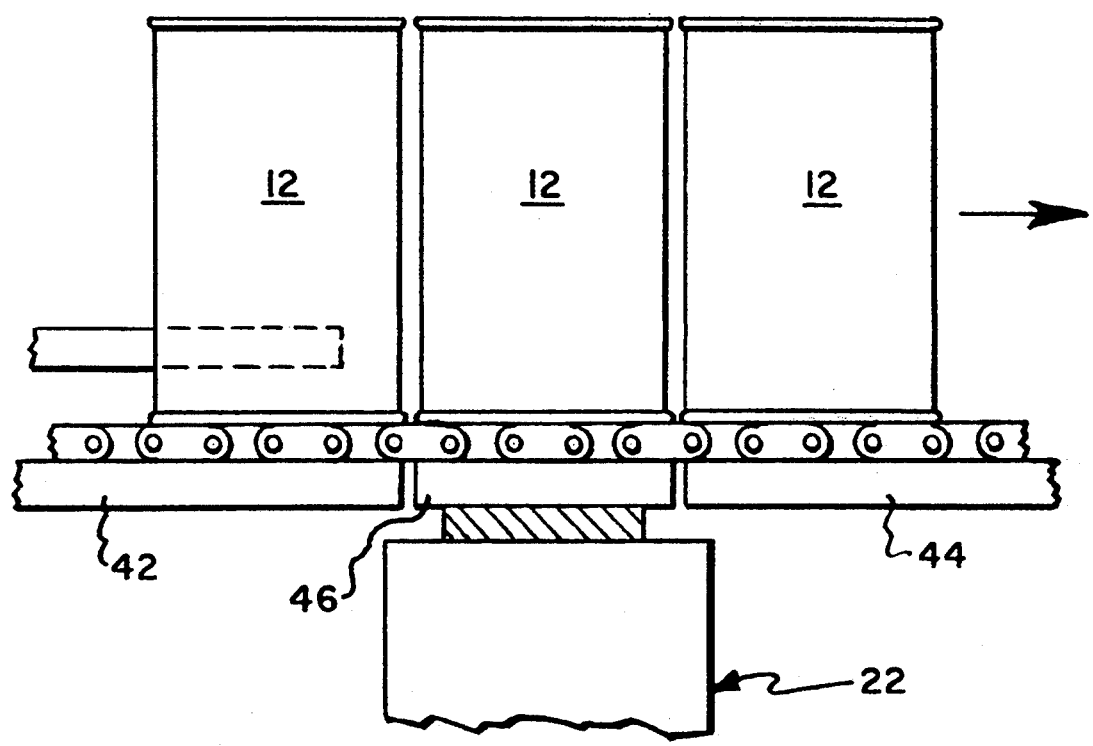
FIG. 7 is a view similar to FIG. 3, but showing a presently preferred construction.

In a recently developed and now preferred form of the invention shown in FIG. 7, the length of the weigh pan employed is further reduced to be essentially equal to, and preferably equal to, the diameter of the containers to be weighed, thereby ensuring that only one container can be supported by the weigh pan during a weighing operation. The length of the weigh pan could be slightly less than container diameter, but this would not be desirable.

Tests have indicated that under the checkweigher operating conditions achievable with this form of the invention, weighing of containers 12 may be effected as same are passed butt-to-butt over the weigh pan, if slight weighing inaccuracies occasioned by friction between adjacent containers is acceptable. However, it is preferable to provide for a slight spacing between adjacent containers or margin of safety in order to prevent friction induced weighing inaccuracies, but such margin of safety may be substantially less than that mentioned in connection with form of the invention described with reference to Chart II.

Reference is now made to the following Chart III, which was calculated using the same equations described above, the same operating conditions of container feed rate and container size used in calculating Charts I and II, and the same effective container length used in calculating Chart II, but with a weigh pan length of 3.00 inches, which corresponds to the assumed footprint diameter of the containers to be weighed and a nominal margin of safety of 0.1 inch.

| CHART III | | | | |
|---|---|---|---|---|
| WPL (IN) | EFFECTIVE PKG LENGTH (IN) | PACKAGE PITCH (IN) | SPEED (FPM) | SETTLE TIME (ms) |
| 3.00 | 1.25 | 3.10 | 155 | 56 |

By viewing Chart III, it will be noted that in accordance with the presently preferred form of the invention, once input operating requirements of container feed rate and container diameter are established, all operating parameters of the checkweigher, including weigh pan length, are established. The values of Chart III are designated in FIG. 6 as $t_3$ and $v_3$.

It will be noted that the settle time of 56 ms shown in Chart III is less than the settle time of 65 ms, which was used as a reference for comparison of the values of Charts I and II in that 65 ms was previously considered to be necessary to obtain acceptable weighing accuracies with prior check-weighing equipment using scale devices thought to have nominal response times of 40 ms to 45 ms. However, it has unexpectedly been noted that as conveyor speeds were decreased in accordance with the practice of the present invention, required settle time also decreased resulting in a settle time of 56 ms being more than sufficient to provide acceptable weighing accuracy.

Containers having a generally oval footprint configuration may also be weighed in accordance with the present invention, but care must be taken to ensure that either the major or minor axis of the footprint, and preferably the minor axis, is maintained in alignment with the direction of conveyor travel.

The substantial reductions in conveyor speed obtainable by the practice of the present invention provide numerous benefits, including greater stability for taller containers; reduction in agitation of liquid product with which the containers are filled resulting in greater stability of containers during a weighing operation; reduction in mechanical noise and wear of the conveyor of the checkweigher; reduction in container damage; greater ease of sorting containers after weighing; and the ability to weigh containers at higher rates than heretofore possible.

What is claimed is:

1. In a checkweigher for use in weighing products having a footprint of either a circular or an oval configuration and of the type having a weigh pan vertically deflectable to provide a signal indicative of the weight of said products and a product conveyor having a pair of parallel, product supporting conveyor elements arranged to move across and in surface engagement with said weigh pan for transporting said products one at a time across said weigh pan to effect weighing thereof, the improvement comprising in combination:

said conveyor elements are spaced apart to underengage with said footprint only immediately adjacent the periphery thereof, and said weigh pan has a length in the direction of movement of said conveyor elements corresponding essentially to the length of said products, as measured in said direction of movement.

2. The improvement according to claim 1, wherein the center-to-center spacing between said conveyor elements corresponds essentially to a diameter dimension of said footprint configuration.

3. The improvement according to claim 2, wherein said products transported across said weigh pan have a pitch essentially equal to said length of said products.

4. The improvement according to claim 1, wherein said conveyor elements are endless conveyor elements having an upper horizontal flight supported adjacent product infeed and discharge ends thereof by vertically stationary guides and supported intermediate said stationary guides by vertically deflectable guides defining said weigh pan, and said checkweigher additionally includes an infeed conveyor for transporting said products to said container infeed end of said horizontal flight, and said infeed conveyor has a product discharge end arranged intermediate said conveyor elements adjacent said infeed end of said horizontal flight and cooperating therewith to define an uninterrupted product footprint engaging transport surface between said infeed conveyor and said infeed end of said horizontal flight.

5. The improvement according to claim 4, wherein the center-to-center spacing between said conveyor elements corresponds essentially to a diameter dimension of said footprint configuration.

6. The improvement according to claim 4, wherein a pair of parallel, container side guide rails are arranged to extend lengthwise of said infeed conveyor and terminate above said stationary guides supporting said infeed end of said horizontal flight at a point adjacent said deflectable guides.

7. The improvement according to claim 6, wherein the center-to-center spacing between said conveyor elements corresponds essentially to a diameter dimension of said footprint configuration.

8. A method of weighing products characterized as having a footprint of either a circular or an oval configuration, comprising:

providing product weighing means including a weigh pan vertically deflectable to provide a signal indicative of the weight of said products; and providing a pair of conveyor elements to underengage said footprint of said products and for movement across and in surface engagement with said weigh pan for effecting weighing of said products one at a time, spacing said conveyor elements to underengage with said footprint only immediately adjacent the periphery thereof and providing said weigh pan with a length in the direction of travel of said conveyor elements not substantially greater than the length of said footprint in said direction of travel of said conveyor elements.

9. A method according to claim 8, wherein said products are caused to be arranged on said conveyor elements with a uniform spacing between sides of said products leading in said direction of conveyor movement not exceeding about 0.25 inch in excess of said length of said weigh pan.

10. A method of weighing products characterized as having a footprint of either a circular or an oval configuration, comprising:

providing product weighing means including a weigh pan vertical deflectable to provide a signal indicative of the weight of said products; and providing a pair of conveyor elements to underengage said footprint of said products and for movement across and in surface engagement with said weigh pan for effecting weighing of said products one at a time, spacing said conveyor elements to underengage with said footprint only immediately adjacent the periphery thereof and providing said weigh pan with a length in the direction of travel of said conveyor elements essentially equal to the length of said products in said direction of travel.

11. A method according to claim 10, wherein said products are caused to be arranged on said conveyor elements with an essentially uniform spacing between sides of said products leading in said direction of conveyor movement not exceeding about 0.1 inch in excess of said length of said products.

12. A method according to claim 10, wherein said products are caused to be arranged on said conveyor elements in a substantially butt-to-butt relationship.

13. In a checkweigher for use in weighing products having a footprint of either a circular or an oval configuration and of the type having a weigh pan vertically deflectable to provide a signal indicative of the weight of said products and a weighing conveyor section arranged to move across and in surface engagement with said weigh pan for transporting said products one at a time across said weigh pan to effect weighing thereof, the improvement comprising in combination:

said weighing conveyor section is an endless conveyor having a pair of parallel conveyor elements spaced apart to underengage with said footprint adjacent the periphery thereof, with said conveyor elements having an upper horizontal flight supported adjacent product infeed and discharge ends thereof by vertically stationary guides and supported intermediate said stationary guides by vertically deflectable guides defining said weigh pan;

a product infeed conveyor for supplying said products in essentially a butt-to-butt relationship;

an infeed conveyor section for transporting said products from said product infeed conveyor to said product infeed end of said horizontal flight, and said infeed conveyor section has a product discharge end arranged intermediate said conveyor elements adjacent said infeed end of said horizontal flight and cooperating therewith to define an uninterrupted product footprint engaging transport surface between said infeed conveyor section and said infeed end of said horizontal flight, and said infeed conveyor section and said weighing conveyor section transport said products at a like speed faster than said product infeed conveyor to provide a desired product pitch for said products transported across said weigh pan; and said weigh pan has a length in the direction of movement of said conveyor elements corresponding essentially to the length of said products, as measured in the direction of movement of said weighing conveyor section.

14. The improvement according to claim 13, wherein a pair of parallel, product side guide rails are arranged to extend lengthwise of said infeed conveyor section and terminate above said stationary guides supporting said infeed end of said horizontal flight at a point adjacent said deflectable guides.

* * * * *